United States Patent
Vander Veen et al.

(10) Patent No.: US 8,354,937 B2
(45) Date of Patent: *Jan. 15, 2013

(54) MOTION-BASED DISABLING OF MESSAGING ON A WIRELESS COMMUNICATIONS DEVICE

(75) Inventors: Raymond Paul Vander Veen, Waterloo (CA); Gerhard Dietrich Klassen, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/489,803

(22) Filed: Jun. 6, 2012

(65) Prior Publication Data

US 2012/0244840 A1 Sep. 27, 2012

Related U.S. Application Data

(63) Continuation of application No. 12/367,020, filed on Feb. 6, 2009, now Pat. No. 8,217,800.

(51) Int. Cl.
*G05B 21/00* (2006.01)
*H04B 1/06* (2006.01)

(52) U.S. Cl. ............ 340/670; 340/3.1; 340/539.13; 455/67.11; 455/550.1; 455/345; 455/26.1; 455/456.1

(58) Field of Classification Search .......... 340/3.1, 340/670, 539.13; 455/67.11, 550.1, 345, 455/26.1, 456.1

See application file for complete search history.

(56) References Cited

U.S. PATENT DOCUMENTS

| | | | |
|---|---|---|---|
| 6,353,778 B1* | 3/2002 | Brown | 701/1 |
| 6,502,022 B1* | 12/2002 | Chastain et al. | 701/36 |
| 6,771,946 B1* | 8/2004 | Oyaski | 455/345 |
| 2002/0198005 A1* | 12/2002 | Hilton et al. | 455/456 |
| 2004/0198306 A1* | 10/2004 | Singh et al. | 455/345 |
| 2004/0209594 A1* | 10/2004 | Naboulsi | 455/404.1 |
| 2005/0255874 A1* | 11/2005 | Stewart-Baxter et al. | 455/550.1 |
| 2006/0099940 A1* | 5/2006 | Pfleging et al. | 455/419 |
| 2007/0026850 A1* | 2/2007 | Keohane et al. | 455/418 |
| 2007/0072553 A1* | 3/2007 | Barbera | 455/67.11 |
| 2008/0064446 A1* | 3/2008 | Camp et al. | 455/565 |
| 2008/0299900 A1* | 12/2008 | Lesyna | 455/26.1 |
| 2009/0224931 A1* | 9/2009 | Dietz et al. | 340/670 |
| 2010/0062788 A1* | 3/2010 | Nagorniak | 455/456.1 |

\* cited by examiner

*Primary Examiner* — Jennifer Mehmood
*Assistant Examiner* — Andrew Bee
(74) *Attorney, Agent, or Firm* — Gowling Lafleur Henderson LLP

(57) ABSTRACT

When a wireless communications device is traveling a speed exceeding a first predetermined threshold but less than a second predetermined threshold, the device is presumed traveling in a motor vehicle. In order to inhibit operation of the wireless communication device when traveling, access to certain device functions or applications such as e-mail, text messaging, etc. are limited by requiring the user of the device to respond correctly to a randomly generated visual challenge, such as, for example, a CAPTCHA (in which a user is prompted to recognize the characters in a visually distorted string of text). This visual challenge presents a sufficient obstacle that the user will be less likely to use the wireless communications device for e-mailing or texting while operating a motor vehicle.

20 Claims, 6 Drawing Sheets

US 8,354,937 B2

MOTION-BASED DISABLING OF MESSAGING ON A WIRELESS COMMUNICATIONS DEVICE

CROSS-REFERENCE TO RELATED APPLICATIONS

This application is a continuation of U.S. patent application Ser. No. 12/367,020 filed Feb. 6, 2009 now U.S. Pat. No. 8,217,800.

TECHNICAL FIELD

The present disclosure relates generally to wireless communications devices and, in particular, to techniques for disabling certain device functionalities based on motion of the device.

BACKGROUND

Wireless communications devices such as the BlackBerry® by Research In Motion Limited provide a variety of useful functions, such as voice communication, e-mail and Web browsing. Instant messaging and e-mail are extremely popular applications on these devices.

U. S. patent application Ser. No. 2008/0268767 (Brown et al.) entitled APPARATUS AND METHOD FOR SELECTIVE INTERFERING WITH WIRELESS COMMUNICATIONS DEVICES discloses a technique for disabling operation of a wireless communications device to prevent usage within a vehicle. A drive circuit coupled to an antenna produces interference within a communications band in response to vehicle motion above a certain threshold.

Even if active interference precludes data transmission or reception over the communications frequency band, some device users might nonetheless remain tempted to type and save draft e-mails for sending at a later time when the active interference is shut off, i.e. when the vehicle has come to a full rest.

U. S. patent application Ser. No. 2004/0254715 (Yamada) entitled IN-VEHICLE EMAIL INCOMING NOTICE UNIT AND EMAIL TRANSMISSION UNIT discloses an in-vehicle navigation device capable of notifying a driver of an incoming email. The device restricts notification to the driver if the speed of the vehicle exceeds a predetermined threshold. This prior-art technology also fails to inhibit the user from attempting to type outgoing messages or to type and save draft messages.

A means of inhibiting users from typing messages while operating a motor vehicle thus remains highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
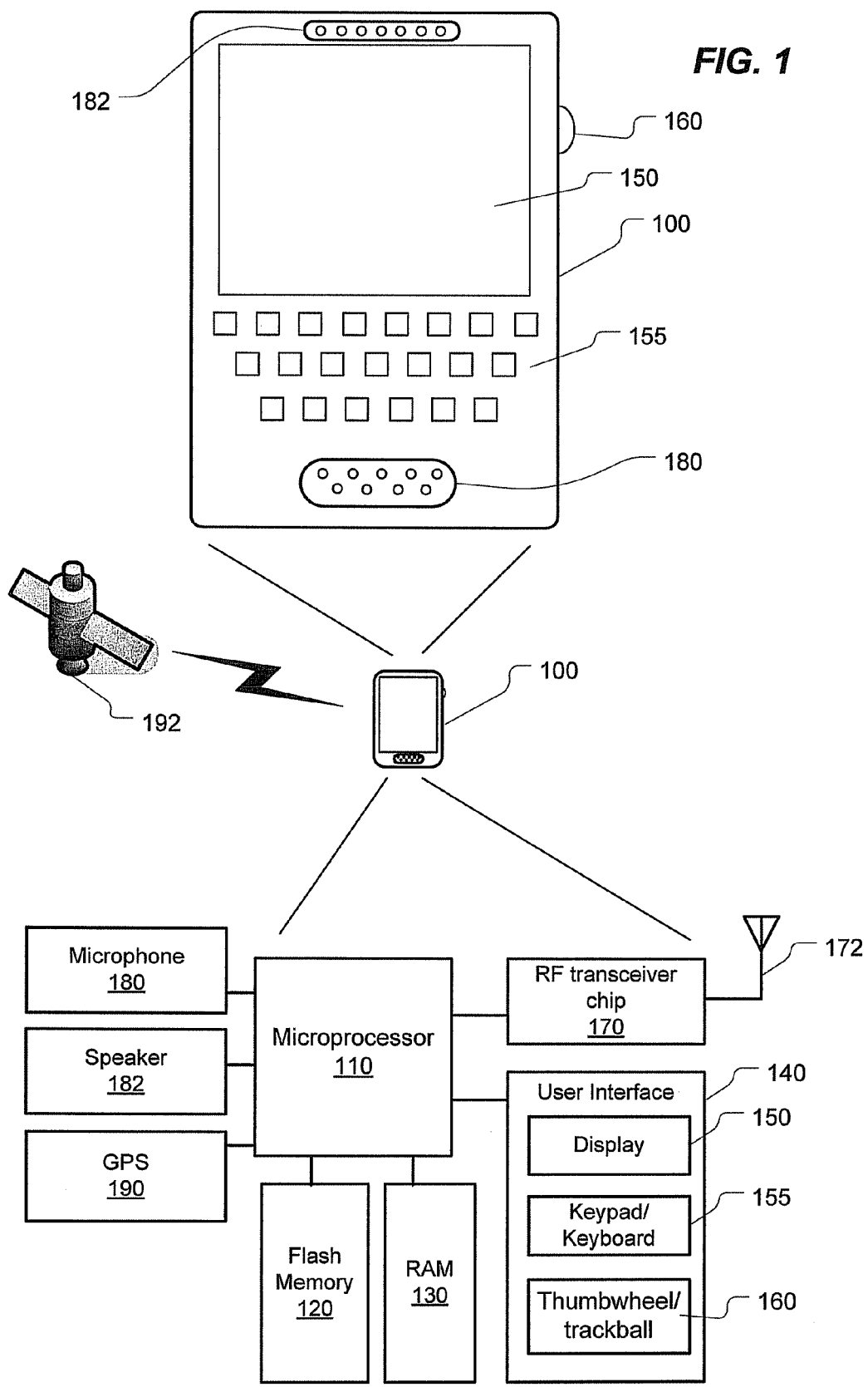
FIG. 1 is a schematic depiction of an exemplary wireless communications device on which the present technology can be implemented, and further depicting certain main components of the device in block diagram format.

The present technology provides a novel method, computer program product, and wireless communications device that limits access to e-mail, text messaging or other functions of the device that would require typing or two-handed manipulation to utilize while simultaneously operating a motor vehicle. When the positioning subsystem, e.g. GPS chipset, determines that the device is moving at a speed greater than a first predetermined threshold (more than walking speed) but less than a second predetermined threshold (aircraft speed), the device is presumed to be traveling in a motor vehicle (e.g. in an automobile, truck, motorboat, personal watercraft, motorcycle, snowmobile, etc.). In order to inhibit a person from typing input into the device while operating a motor vehicle, the device presents the user with a visual challenge that would easily be solved by a passenger but which would pose an obstacle to a driver. The visual challenge may be, for example, a CAPTCHA (Completely Automated Turing Test To Tell Computers and Humans Apart), i.e. a string of visually distorted text that the user must attempt to recognize and then type into the prompt. Other variations on this visual challenge can, of course, be used such as, for example, identifying an objects of a photograph, identifying a common object in multiple photographs, solving visual puzzles, performing mathematical operations, etc.

Thus, an aspect of the present technology is a method of restricting access to e-mail and instant messaging on a wireless communications device. The method includes determining a current speed of the device, and determining if the current speed of the device is greater than a lower threshold and optionally also less than an upper threshold, in which case the device is presumed to be traveling in a motor vehicle. If the device is presumed to be traveling in a motor vehicle, the device challenges the user to respond to a randomly generated visual challenge in order to gain access to e-mail or instant messaging.

Another aspect of the present technology is a computer program product comprising code adapted to perform the steps of the foregoing method when the computer program product is loaded into memory and executed on a processor of a wireless communications device.

Yet another aspect of the present technology is a wireless communications device that disables or restricts messaging by challenging users to respond correctly to a visual challenge such as a CAPTCHA. The device includes a radiofrequency transceiver for transmitting and receiving text-based communications, a positioning subsystem for determining a current speed of the device, and a processor operatively coupled to a memory and to the positioning subsystem for receiving the current speed from the positioning subsystem and for determining whether the current speed is greater than a first predetermined threshold and optionally also less than a second predetermined threshold. The processor and memory are further coupled to a display for displaying a randomly generated visual challenge to be solved in order to gain access to the text-based communications.

The details and particulars of these aspects of the technology will now be described below, by way of example, with reference to the attached drawings.

FIG. 1 is a schematic depiction of a wireless communications device 100 on which the present technology can be implemented. The term wireless communications device is meant to encompass a broad range of cellular and mobile devices such as, for example, smartphones, cell phones, personal digital assistants (PDAs), computing tablets, wireless-enabled laptops, etc.

As shown schematically in FIG. 1, the wireless communications device 100 includes a microprocessor (referred to herein as a "processor") 110 operatively coupled to memory (Flash Memory 120 and/or RAM 130). The device 100 has a user interface 140 which includes a display (e.g. a LCD screen) 150, a keyboard/keypad 155. A thumbwheel/trackball 160 may optionally be provided as part of the user interface. Alternatively, the user interface 140 may include a touch screen in lieu of a keyboard/keypad. The wireless communications device 100 includes a radiofrequency (RF) transceiver chipset 170 for wirelessly transmitting and receiving data and voice communications, e.g. via a cellular network. The wireless communications may be performed using CDMA, GSM, or any other suitable communications standard or protocol. A microphone 180 and speaker 182 are provided for voice communications.

As further depicted in FIG. 1, the wireless communications device 100 includes a GPS chipset 190 (or other positioning subsystem) to determine the current location of the device. The GPS chipset also determines the current speed of the device by computing the rate of change of position over time. Although the present disclosure refers to expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

Another sort of positioning subsystem may be used as well, e.g. a radiolocation subsystem that determines its current location using radiolocation techniques, as will be elaborated below. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. Radiolocation techniques may also be used in conjunction with GPS in a hybrid positioning system. References herein to "GPS" are meant to include Assisted GPS and Aided GPS.

Instead of, or in addition to, a positioning subsystem such as, for example, a GPS receiver chipset, the device 100 can have an accelerometer from which the current speed can be obtained (i.e. velocity being the integral of acceleration over time). As will be appreciated, the current speed can be determined in any other manner, including receiving the current speed from another sensor-equipped device or from a speed sensor onboard the vehicle itself (e.g. via Bluetooth® link or via another type of wireless or wired connection).

Figure 2:
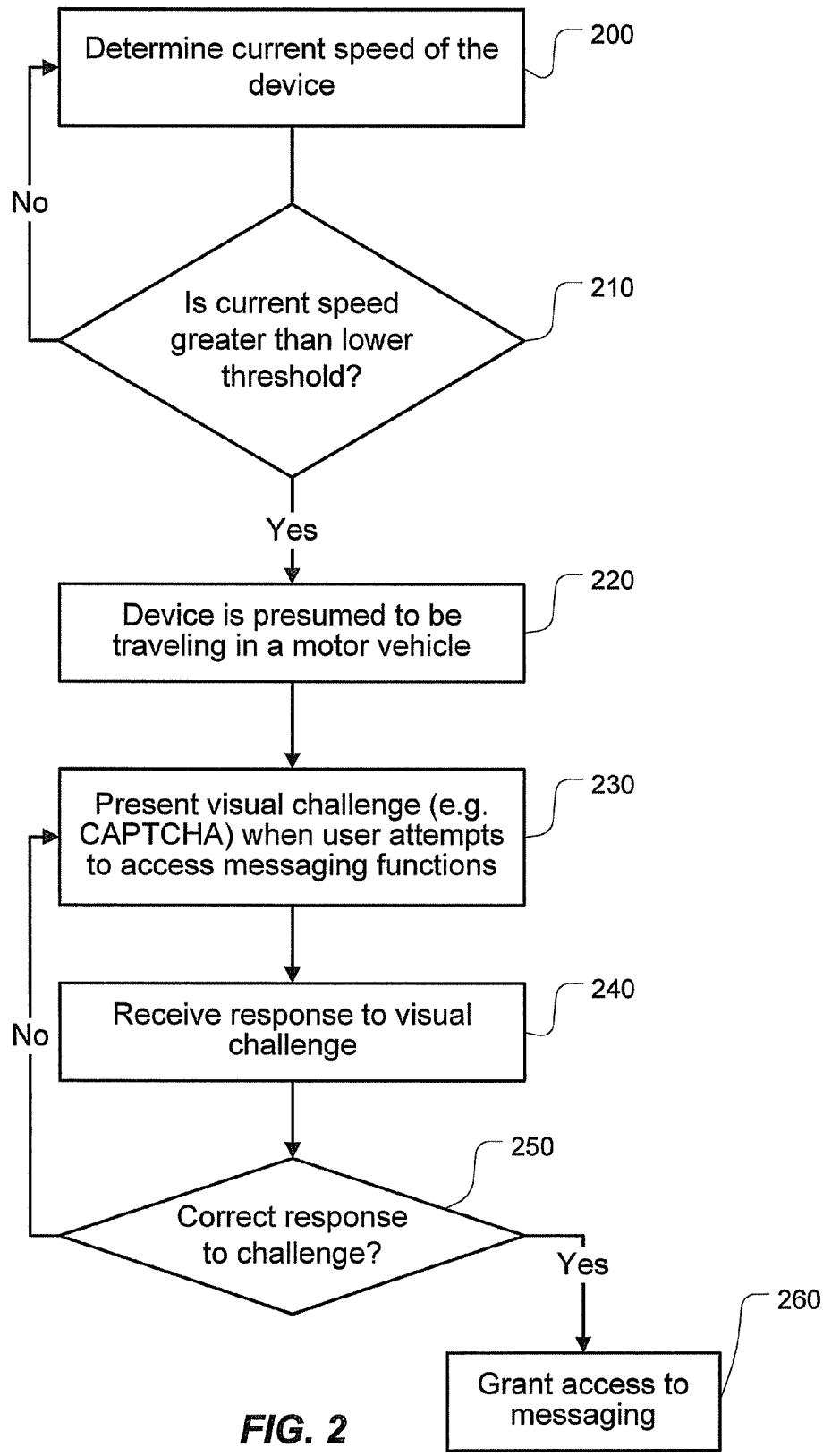
FIG. 2 is a flowchart depicting steps of a method of inhibiting messaging by an operator of a motor vehicle in accordance with an implementation of the present technology.

Some of the main steps of the novel method disclosed herein are depicted in FIG. 2. As depicted in this figure, the novel method of restricting access to e-mail and instant messaging on a wireless communications device entails determining a current speed of the device (step 200). If the current speed of the device is greater than a lower threshold, the device is presumed to be traveling in a motor vehicle. Optionally, an upper threshold may be used as well to determine if the current speed of the device is very high, in which case the device is presumed to be traveling in an airplane. This determination is made at step 210. If the device is presumed to be traveling in a motor vehicle, as shown in step 220, the user is then challenged to respond to a randomly generated visual challenge in order to gain access to one or more applications, e.g. e-mail or instant messaging. To limit access by the user to messaging or other applications that require typing or two-handed operation, the device presents a visual challenge such as a CAPTCHA (step 230) and receives the answer (step 240). If the response received is correct (step 250), then access is granted to messaging (step 260). Otherwise, if access is denied, operations cycle back to step 230 to present a new CAPTCHA or other visual challenge to the user. In one implementation, the device can tolerate a predetermined number of attempts to respond correctly to the visual challenge, after which the device may shut out the user for a predetermined period of time (e.g. 10 minutes, 30 minutes, 1 hour, or any other suitable duration) as a further lockout measure. It bears emphasizing that the technology may be implemented using only a lower threshold for determining whether the current speeds warrants a visual challenge. As an optional refinement, an upper threshold may also be used to determine whether a visual challenge is to be displayed or not.

This visual challenge is meant to dissuade a driver of the motor vehicle from attempting to respond to the visual challenge while driving. The visual challenge, however, is meant to be easily solved by a passenger who can devote his or her undivided attention to the task of responding to the challenge. The visual challenge may involve identifying a string of warped text, solving a puzzle or riddle, or performing a mathematical operation, to name but a few possibilities.

In one implementation, challenging the user can involve prompting the user to type out the letters of a string of visually distorted text, or prompting the user to type a name of an object displayed in an image onscreen, or prompting the user to type a name of an object that is common to a plurality of images displayed onscreen.

In one implementation, the method operates only when the current speed is between a lower threshold of between 6-10 km/h (e.g. 8 km/h) and an upper threshold of between 200-240 km/h (e.g. 220 km/h). The lower threshold is meant to be the upper speed of walking. The upper threshold is meant to represent the lowest speed of an aircraft. Thus, it is presumed that any speed between these two thresholds means that the device is traveling in a motor vehicle. For pedestrians walking (speed is less than lower threshold) or passengers in an aircraft (speed is above upper threshold), the message-disabling feature on the device is not operational, i.e. the method of restricting access to texting, email or other device functionalities remains dormant.

For addressing the special case of "stop-and-go" traffic conditions, the method may optionally involve determining whether the current speed is below the lower threshold for at least a predetermined period of time, thereby indicating that the motor vehicle has stopped and that the device may again be operated in an unrestricted manner. In other words, if the device's current speed reading falls to zero or below the lower threshold for a predetermined period of time (e.g. more than 2 minutes or 5 minutes) then the device may presume that the vehicle has come to a permanent rest (i.e. the vehicle is parked or at least at a red light). In such a case, the device may enable direct and immediate (unrestricted) access to the messaging functions (texting, e-mailing, etc.). Once the vehicle starts to move again, messaging is disabled again. The predetermined time before (restricted) messaging is re-enabled can be adjusted by the user, system administrator, manufacturer, etc. to enable unrestricted operation of the device and to limit the likelihood that the user will attempt to the use the device when stuck in stop-and-go traffic (where inattention to the vehicle immediately ahead can easily lead to an accident).

The foregoing method steps can be implemented as coded instructions in a computer program product. In other words, the computer program product is a computer-readable medium upon which software code is recorded to perform the foregoing steps when the computer program product is loaded into memory and executed on the microprocessor of the wireless communications device.

Figure 3:
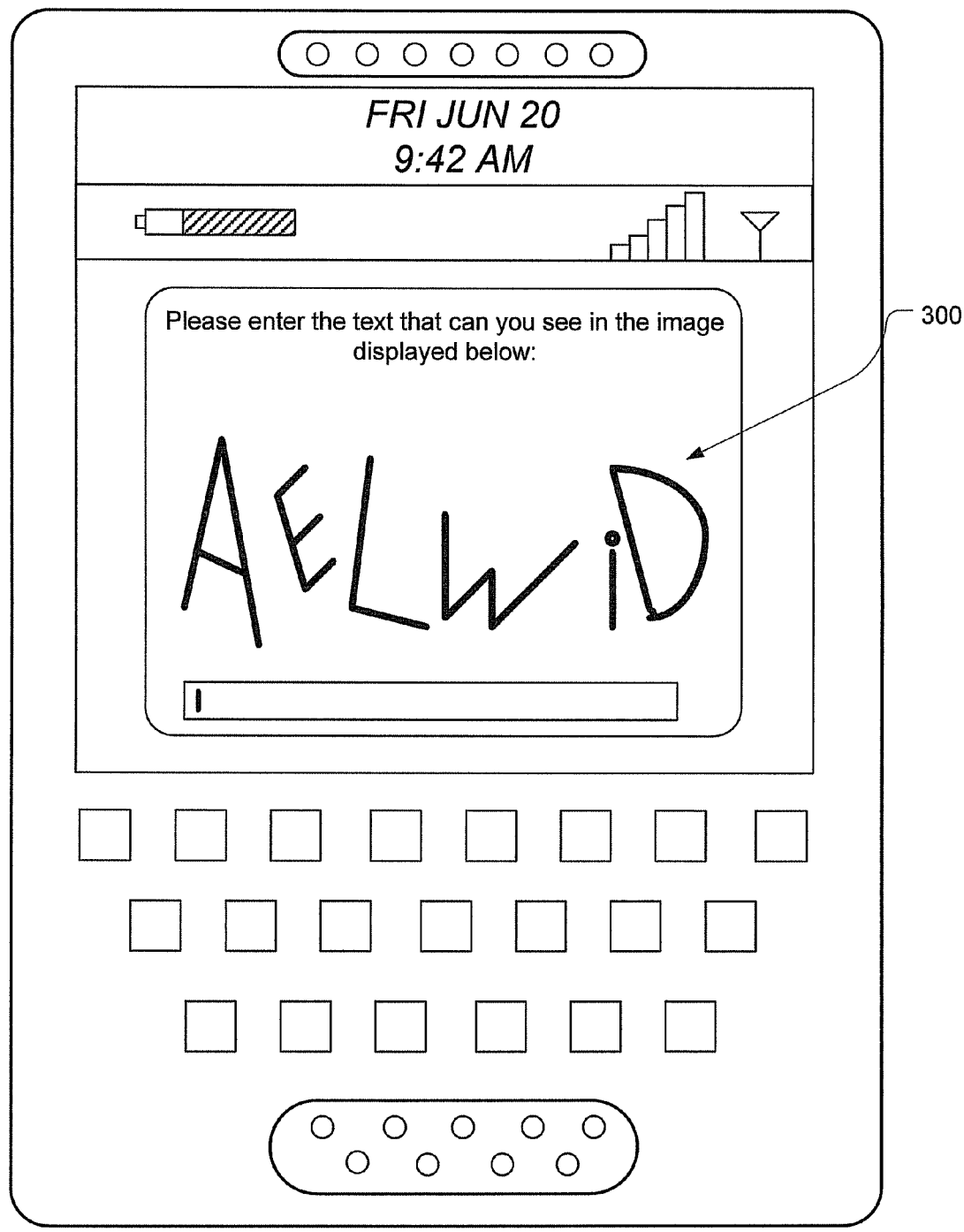
FIG. 3 is an example of a CAPTCHA used as a visual challenge for restricting access to the messaging functions of the wireless communications device.

FIG. 3 presents an example of a CAPTCHA as one effective type of visual challenge that can be used to limit access to messaging while the device is moving at a certain velocity. As depicted by way of example in FIG. 3, the device presents onscreen a CAPTCHA challenging the device user to attempt to recognize the alphanumeric characters constituting a string of visually distorted text. The CAPTCHA can be generated randomly so that users will not be able to learn or remember patterns seen previously. The generation of the CAPTCHA and the process of receiving and comparing the user's answer to the correct answer can be controlled using a CAPTCHA challenge controller, an application executing on the device.

As presented in the specific example depicted in FIG. 3, the device 100 displays a string of characters that are visually warped (distorted). The user of the device must recognize the characters and then enter the text into a prompt. The CAPTCHA can be any string of letters, numbers or special symbols. In the specific example presented in FIG. 3, the visually distorted letters A E L W i D are displayed. Assuming the user correctly recognizes and types in these letters in the prompt, the device will grant access to the messaging function on the assumption that the user is a passenger in the vehicle. If the user does not respond, the CAPTCHA may time out. If the user responds incorrectly, the device does not grant access to the messaging function. The device optionally may present a new CAPTCHA if an incorrect answer is provided.

Whatever the precise nature of the visual challenge, its purpose, once displayed onscreen on a wireless communications device, is to inhibit impulsive or frivolous usage of texting, e-mailing or any other applications providing device functionalities that require typing or two-handed manipulation. For example, the device may disable or inhibit usage of all device functions (web browsing, calendar, games, etc.) except voice communications. This novel technology (challenging the user of the device to responds correctly to a visual challenge) may also be used to restrict usage of voice communications, if desired. This may be useful in jurisdictions where it is illegal to speak on a cell phone while operating a motor vehicle.

The challenge-response test can be cryptographic (e.g. a password) or non-cryptographic (e.g. a CAPTCHA that requires the user to read a visually distorted word or text.) The CAPTCHA (Completely Automated Turing Test To Tell Computers and Humans Apart) is believed to provide a sufficient obstacle or barrier to a user operating a motor vehicle that he or she will not be tempted to try to read the visually distorted text and type out the word in the onscreen prompt. In lieu of visually distorted or warped text, the CAPTCHA may be require the user to recognize an image. For example, the CAPTCHA may be a picture of a dog, a cat or a bird with the question "What type of animal is this?". To gain access to e-mail or instant messaging, or to enable the messaging function, the user must type in the answer ("dog", "cat", "bird", etc.). The CAPTCHA may also require the user to identify an object that is common to a set of images. For example, the images may be various photos, each of which contains a dog. The CAPTCHA queries the user to enter the common object found in each of the images. To gain access to e-mail or to enable the messaging function, the user must type in the correct answer "dog" at the onscreen prompt provided. As will be appreciated, the CAPTCHA can present any number of different challenges to the user that requires sufficient attention to effectively dissuade the user from attempting to gain access to the messaging function. For a passenger traveling in a motor vehicle (e.g. car, bus, train, boat, etc.), the challenge-response test is easily met by recognizing the visually warped text and then by entering the text at the onscreen prompt.

Figure 4:
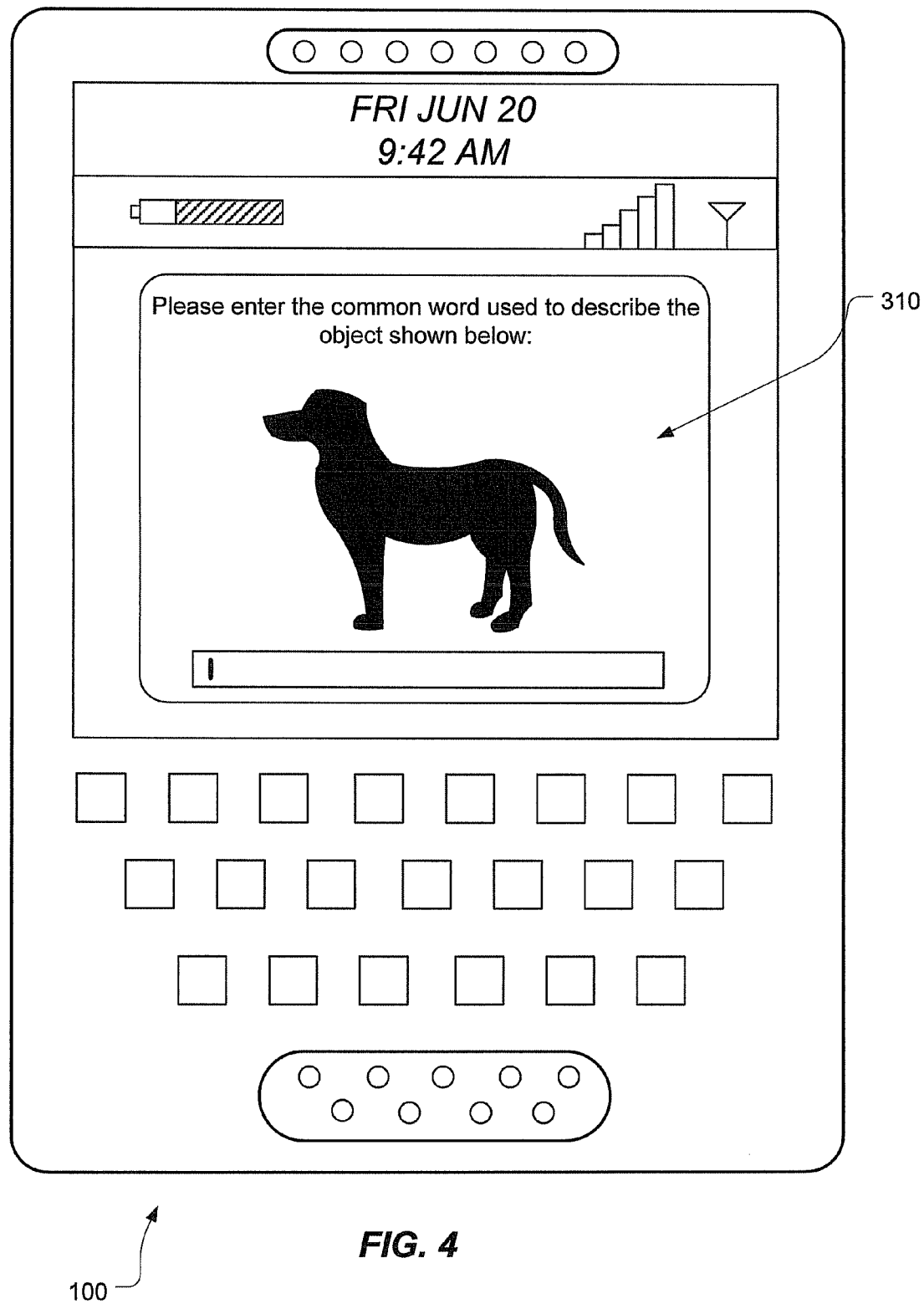
FIG. 4 is another example of a CAPTCHA used as a visual challenge for restricting access to the messaging functions of the wireless communications device.

FIG. 4 shows an example of a visual challenge that involves having to recognize an object. In this particular example, the image of a dog 310 is presented onscreen. The user must identify that the object (i.e. the dog) and type in the common word for the object ("dog") in the prompt. The CAPTCHA challenge controller can be configured to randomly generate one of a text-based, number-based or image-based CAPTCHA in order to further augment the difficulty of responding.

Figure 5:
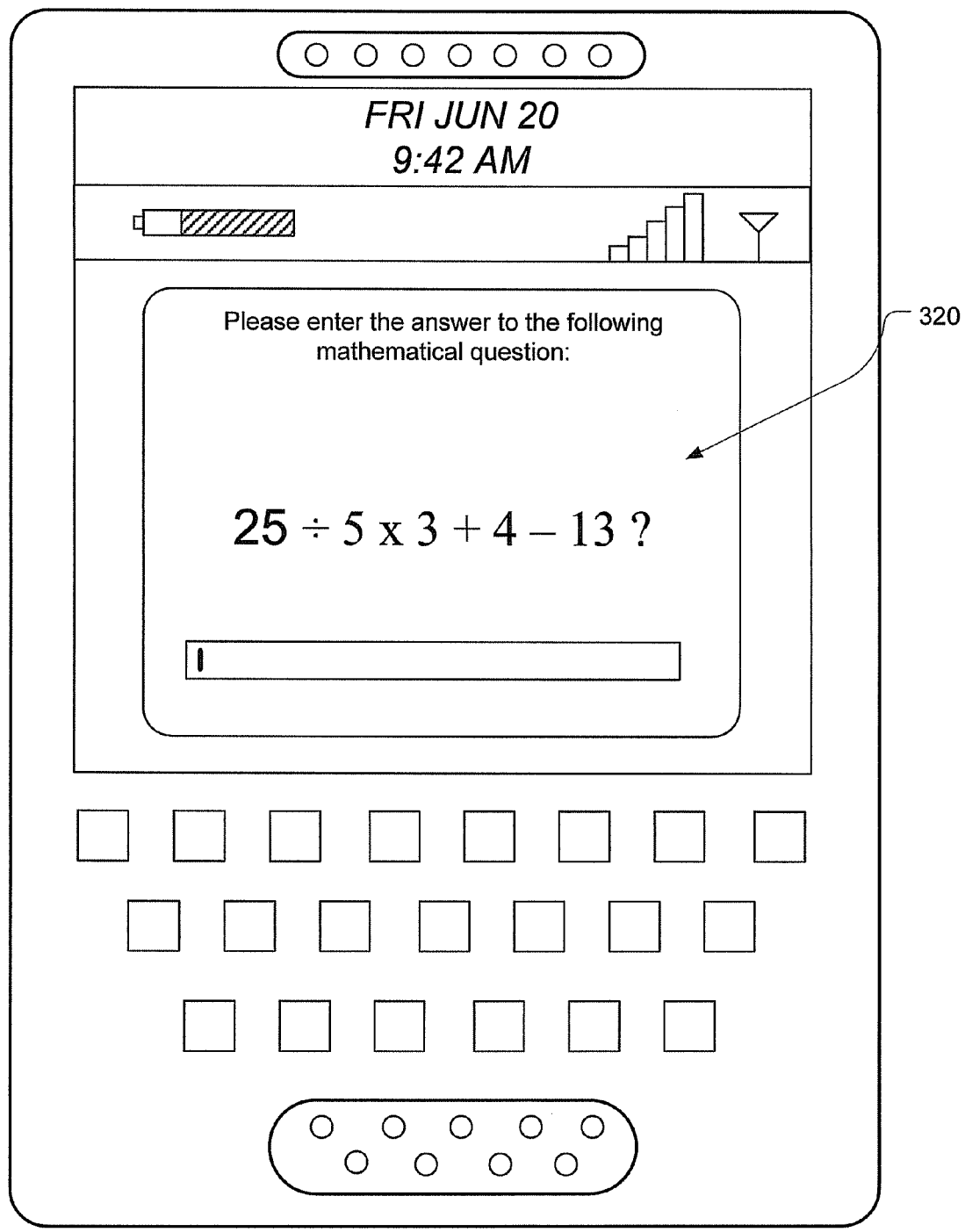
FIG. 5 is an example of a mathematical question used as a visual challenge for restricting access to the messaging functions of the wireless communications device.

The challenge can take other forms as well. For example, the challenge can be to respond to one or more mathematical questions (or to perform a series of mathematical operations as found in "skill-testing questions"). In other words, challenging can involve prompting the user to type a numerical value as an answer to one or more mathematical questions (for example, standard math-based "skill-testing questions" such as "25÷5×3−14+9?"). The use of a mathematical question 320 as a challenge is depicted by way of example in FIG. 5.

In one implementation, a difficulty level of the randomly generated visual challenge is proportional to the current speed. For example, where the challenge is a CAPTCHA, the amount of textual distortion (character warping) and the spacing between characters can be increased to thereby augment the difficulty level. Thus, when the device travels faster, it is presumed that the risk of serious injury from inadvertent usage of the device increases and thus the barrier to access can be increased.

In another implementation, a difficulty level of the randomly generated visual challenge is based on a current location of the device. The current location of the device may be proportional, indicative or related to the degree of risk associated with usage of the device. For example, if the current location is correlated with information stored in a geographical information system (GIS) database then it becomes possible to determine (based on the current location) if the device is currently in an area or on a roadway that merits a heightened degree of caution. For example, if the device recognizes that its current location corresponds to an urban freeway or highway, a downtown boulevard, or a street in a school zone, then the degree of complexity of the visual challenge can be increased to make it even more difficult to access the messaging functions on the device. Similarly, if the current location is in a zone or on a roadway with historically high traffic congestion (or a historically high accident rate), then the visual challenge can be made proportionately more difficult. As a further variant, the time of day and day of the week can be used either alone in conjunction with the current location to vary the difficulty level or complexity of the visual challenge (or the number of sequential visual challenges that must be solved to access or re-enable the messaging functions). For example, if the time of day and the day of the week correspond to rush hour, and the current location corresponds to a downtown boulevard, then the device may increase the difficulty level of the visual challenge to ensure that the driver cannot easily defeat the challenge.

Figure 6:
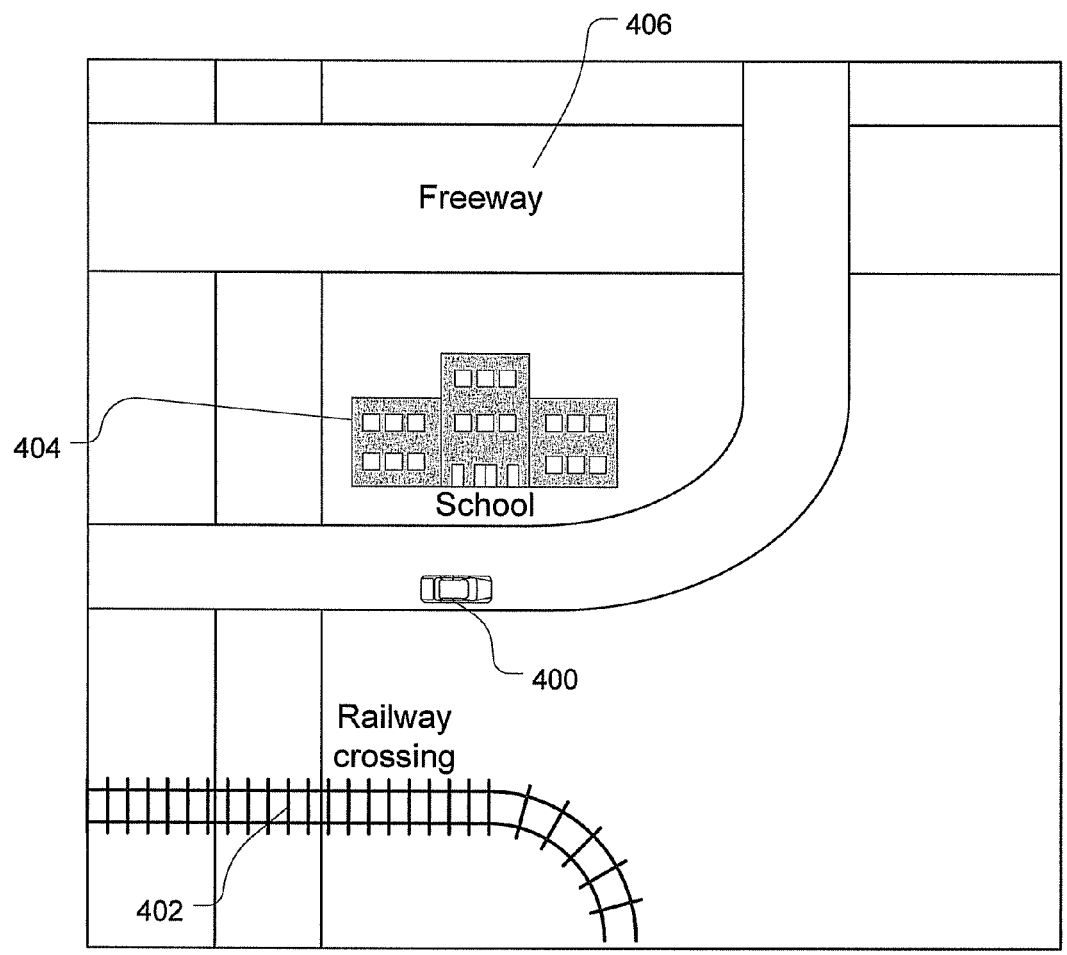
FIG. 6 schematically depicts high-risk traffic zones where the current location of the device can be used to augment the difficulty level or complexity of the visual challenge in accordance with another aspect of this technology.

FIG. 6 shows schematically how various areas or zones through which the user and his device may be traveling may be considered high-risk zones where extra vigilance is warranted. For example, as shown in the map presented by way of example in FIG. 6, the car icon 400 can be used to represent the current location of the device. If the device (as represented by the car icon) approaches the railway crossing 402 (a potentially dangerous location), the complexity or difficulty level of the visual challenge can be augmented. Similarly, if the device approaches the school 404, the difficulty level can be increased. Likewise, again by way of example, if the device enters the freeway, the difficulty level can be adjusted. The difficulty level for each of these high-risk zones can be further modulated by taking into account the time of day and the day of the week. Thus, for example, the risks associated with the railway crossing may only exist at times for which the train is scheduled to be passing through the area. Likewise, if the vigilance warranted by the school zone may only be necessary during weekdays either in the morning or in the afternoon. Likewise, the freeway may only be considered high risk during rush hour. This illustrates how both time and location can be used to vary the complexity of the CAPTCHA or other visual challenge. The difficulty level can also be augmented by requiring correct responses to multiple sequential CAPTCHAS or other visual challenges.

This new technology has been described in terms of specific implementations and configurations (and variants thereof) which are intended to be exemplary only. The scope of the exclusive right sought by the applicant is therefore intended to be limited solely by the appended claims.

The invention claimed is:

1. A method of restricting access to one or more applications on a wireless communications device, the method comprising:
   determining a current speed of the device;
   where the current speed of the device is greater than a lower threshold
      displaying a randomly generated visual challenge, wherein a difficulty level of the randomly generated visual challenge is based on a current location of the device; and
      restricting access to at least one application on the device until a correct response to the randomly generated visual challenge is received.

2. The method as claimed in claim 1 wherein the difficulty level is set by consulting a geographical information system database to determine if the current location corresponds to a high-risk zone.

3. The method as claimed in claim 1 wherein the difficulty level of the visual challenge is further based on the current speed.

4. The method as claimed in claim 1 wherein the randomly generated visual challenge is a text-based visual challenge and wherein displaying the randomly generated visual challenge comprises displaying a request to type out the letters of a string of visually distorted text.

5. The method as claimed in claim 1 wherein the randomly generated visual challenge is an image-based visual challenge and wherein displaying the randomly generated visual challenge comprises displaying a request to type a name of an object displayed in an image onscreen.

6. The method as claimed in claim 1 wherein the randomly generated visual challenge is an image-based visual challenge and wherein displaying the randomly generated visual challenge comprises displaying a request to type a name of an object that is common to a plurality of images displayed onscreen.

7. The method as claimed in claim 1 wherein the randomly generated visual challenge is an number-based visual challenge and wherein displaying the randomly generated visual challenge comprises displaying a request to type a numerical value as an answer to one or more mathematical questions.

8. The method as claimed in claim 1 wherein the randomly generated visual challenge is a CAPTCHA.

9. The method as claimed in claim 1 wherein the randomly generated visual challenge is displayed provided the current speed is less than an upper threshold.

10. The method as claimed in claim 1 wherein determining the current speed of the device comprises determining whether the current speed is below the lower threshold for at least a predetermined period of time.

11. A non-transitory computer readable medium comprising code which, when loaded into memory and executed on a processor of a wireless communications device, is adapted to restrict access to one or more applications by:
    determining a current speed of the device;
    where the current speed of the device is greater than a lower threshold
       displaying a randomly generated visual challenge, wherein a difficulty level of the randomly generated visual challenge is based on a current location of the device; and
       restricting access to at least one application on the device until a correct response to the randomly generated visual challenge is received.

12. The non-transitory computer readable medium as claimed in claim 11 wherein the difficulty level is set by consulting a geographical information system database to determine if the current location corresponds to a high-risk zone.

13. The non-transitory computer readable medium as claimed in claim 11 wherein the code comprises a CAPTCHA challenge controller for generating the CAPTCHA having a visually distorted string of text and for receiving and comparing input to determine if the CAPTCHA has been correctly solved.

14. A wireless communications device comprising:
    a positioning subsystem for determining a current location and a current speed of the device; and
    a processor operatively coupled to a memory and to the positioning subsystem for receiving the current speed from the positioning subsystem and for determining whether the current speed is greater than a first predetermined threshold, and if the current speed exceeds the first predetermined threshold, for randomly generating a visual challenge wherein a difficulty level of the visual challenge is based on the current location of the device, wherein the processor and memory are further coupled to a display for displaying the visual challenge to be solved in order to gain access to at least one application on the device.

15. The device as claimed in claim 14 wherein the difficulty level is set by consulting a geographical information system database to determine if the current location corresponds to a high-risk zone.

16. The device as claimed in claim 14 wherein the processor and memory cooperate to execute a CAPTCHA challenge controller for generating a CAPTCHA having a visually distorted string of text and for receiving and comparing input to determine if the CAPTCHA has been correctly solved.

17. The device as claimed in claim 14 wherein the processor determines whether the current speed is below the lower threshold for at least a predetermined period of time.

18. The device as claimed in claim 14 wherein the difficulty level of the visual challenge is further based on the current speed.

19. The device as claimed in claim 14 wherein the positioning subsystem is a Global Positioning Subsystem (GPS) receiver.

20. The device as claimed in claim 14 wherein the processor and memory only cause the visual challenge to be displayed when the current speed is less than a second predetermined threshold.

* * * * *